(12) United States Patent
Ni et al.

(10) Patent No.: US 7,855,099 B2
(45) Date of Patent: Dec. 21, 2010

(54) MANUFACTURING METHOD FOR A SECURE-DIGITAL (SD) FLASH CARD WITH SLANTED ASYMMETRIC CIRCUIT BOARD

(75) Inventors: Jim Chin-Nan Ni, San Jose, CA (US); Abraham C. Ma, Fremont, CA (US); Paul Hsueh, Concord, CA (US); Ming-Shiang Shen, Taipei Hsien (TW)

(73) Assignee: Super Talent Electroncis, Inc., San Jose, CA (US)

(*) Notice: Subject to any disclaimer, the term of this patent is extended or adjusted under 35 U.S.C. 154(b) by 80 days.

(21) Appl. No.: 12/423,657

(22) Filed: Apr. 14, 2009

(65) Prior Publication Data

US 2009/0203168 A1 Aug. 13, 2009

Related U.S. Application Data

(60) Division of application No. 11/309,844, filed on Oct. 11, 2006, now Pat. No. 7,535,088, and a continuation-in-part of application No. 10/913,868, filed on Aug. 6, 2004, now Pat. No. 7,264,992, and a continuation-in-part of application No. 09/478,720, filed on Jan. 6, 2000, now Pat. No. 7,257,714.

(51) Int. Cl.
*H01L 21/50* (2006.01)
*H01L 21/48* (2006.01)
*H01L 21/44* (2006.01)
*H01L 23/02* (2006.01)
*H01L 23/498* (2006.01)

(52) U.S. Cl. .............. 438/106; 438/125; 438/126; 257/679; 257/E23.064

(58) Field of Classification Search .......... 438/106, 438/125, 126; 257/679, E23.064
See application file for complete search history.

(56) References Cited

U.S. PATENT DOCUMENTS

| | | | | |
|---|---|---|---|---|
| 6,381,143 | B1 * | 4/2002 | Nakamura | 361/737 |
| 6,580,615 | B1 * | 6/2003 | Nakanishi et al. | 361/737 |
| 6,910,635 | B1 * | 6/2005 | Miks et al. | 235/487 |
| 7,264,992 | B2 * | 9/2007 | Hsueh et al. | 438/106 |

\* cited by examiner

*Primary Examiner*—Luan C Thai
(74) *Attorney, Agent, or Firm*—gPatent LLC; Stuart T. Auvinen

(57) ABSTRACT

A flash-memory device has a printed-circuit board assembly (PCBA) with a PCB with a flash-memory chip and a controller chip. The controller chip includes an input/output interface circuit to an external computer over a Secure-Digital (SD) interface, and a processing unit to read blocks of data from the flash-memory chip. The PCBA is encased inside an upper case and a lower case, with SD contact pads on the PCB that fit through contact openings in the upper case. Supporting end ribs under each of the SD contact pads and middle ribs support the PCB at a slanted angle to the centerline of the device. The PCB slants upward at the far end to allow more thickness for the chips mounted to the bottom surface of the PCB, and slants downward at the insertion end to position the SD contact pads near the centerline.

4 Claims, 7 Drawing Sheets

UPPER CASE

LOWER CASE

MANUFACTURING METHOD FOR A SECURE-DIGITAL (SD) FLASH CARD WITH SLANTED ASYMMETRIC CIRCUIT BOARD

RELATED APPLICATION

This application is a divisional of U.S. Ser. No. 11/309,844, filed Oct. 11, 2006, now U.S. Pat. No. 7,535,088, which is a continuation-in-part (CIP) of "Electronic Data Storage Medium with Fingerprint Verification Capability", U.S. Ser. No. 09/478,720, filed Jan. 6, 2000, and is a continuation-in-part (CIP) of "Removable flash integrated memory module card and method of manufacture", U.S. patent application Ser. No. 10/913,868, filed Aug. 6, 2004.

FIELD OF THE INVENTION

This invention relates to flash-memory cards, and more particularly to manufacturing a flash card with a slanted printed-circuit board (PCB).

BACKGROUND OF THE INVENTION

Flash-memory cards using standards such as compact-flash (CF), Multi-Media Card/Secure Digital (MMC/SD), and Sony's MemoryStick are popular today. Such flash cards may be used in consumer devices such as digital cameras, music players, phones, palm or other portable computers, and may be inserted into personal computers and printers. Various extensions of these standards exist, such as Super Digital, an extension of Secure Digital (SD) that does not have all the security features and digital-rights management features of SD. MMC/SD is popular due to its small size, about the size of a postage stamp.

Data files stored on such as flash card, or on a more traditional floppy disk or diskette may require a password for access, or may use encryption to secure the data within the file. Confidential documents can be delivered over a network by adding safety seals and impressions. However, the confidential data is at risk due to breaking of the passwords, encryption codes, safety seals and impressions, thereby resulting in unsecure transfer of the information.

The parent application disclosed an electronic data storage medium that had fingerprint verification capability. FIG. 1 is a schematic circuit block diagram illustrating an electronic data storage medium disclosed in the parent application.

The electronic data storage medium with fingerprint verification capability can be accessed by external computer 9 using input/output interface circuit 5, which may use a Personal-Computer Memory Card International Association (PCMCIA), RS-232, or similar interface to communicate. The electronic data storage medium can be located inside or outside of the external computer.

The electronic data storage medium with fingerprint verification capability is packaged in card body 1, and includes processing unit 2, memory device 3, fingerprint sensor 4, input/output interface circuit 5, display unit 6, power source 7, and function key set 8.

Memory device 3 can be a flash memory device that stores data files. Fingerprint sensor 4 scans a fingerprint of a user to generate fingerprint scan data. Processing unit 2 connects to other components and can operate in various modes, such as a programming mode, a data retrieving mode, and a data resetting mode. Power source 7 supplies electrical power to processing unit 2. Function key set 8 allows the user to input a password that is verified by processing unit 2. Display unit 6 shows the operating status of the electronic data storage medium.

The electronic data storage medium may be a subset of the electronic data storage medium with fingerprint verification capability. The electronic data storage medium is packaged in card body 1, and includes processing unit 2, memory device 3, and input/output interface circuit 5. While such an electronic data storage medium is useful, manufacturing methods and product designs are desired that can be cost-effectively produced. In particular, designs for making the card body or casing that encapsulates the electronic components are desired. To reduce the cost and size, designs of the electronic data storage medium that eliminate some costly components, such as the fingerprint sensor, function key set, and display, are desirable. An external power source may further reduce costs and size. Such device designs can allow a low-cost electronic data storage medium to be manufactured.

DETAILED DESCRIPTION

The present invention relates to an improvement in flash-memory cards. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have developed a variety of manufacturing methods for electronic data storage medium devices such as flash-memory cards that can replace hard disk drives with solid-state flash memory. Flash memory chips currently employ electrically-erasable programmable read-only memory (EEPROM) are the primary storage medium. Such flash memory is more rugged than rotating magnetic disks.

The inventors have realized that the card body may be constructed from a two-piece casing that encloses a printed-circuit board assembly (PCBA) that has a circuit board with flash-memory and controller chips mounted thereon. The two-piece casing can be assembled together and sealed in a variety of ways, such as with snaps, tabs and slots, ultrasonic ridges, adhesives, and screw fasteners.

The inventors have further realized that the card body can conform to existing flash-card standards, such as Secure Digital (SD). However, Secure Digital is a particularly thin and flat standard compared to other standards such as Compact Flash. Being able to mount the chips on a PCB within such as SD card is challenging. However, the inventors have discovered that the PCB inside a SD card may be slanted within the SD card body for a better fit. The slanting of the PCB allows the flash-memory and controller chips to be mounted on one side, and the metal contacts for the SD standard to be on the other side of the PCB. The PCB is tilted to allow both the chips and the contact pads to fit within the card body without otherwise increasing the thickness of the card body.

Figure 2:
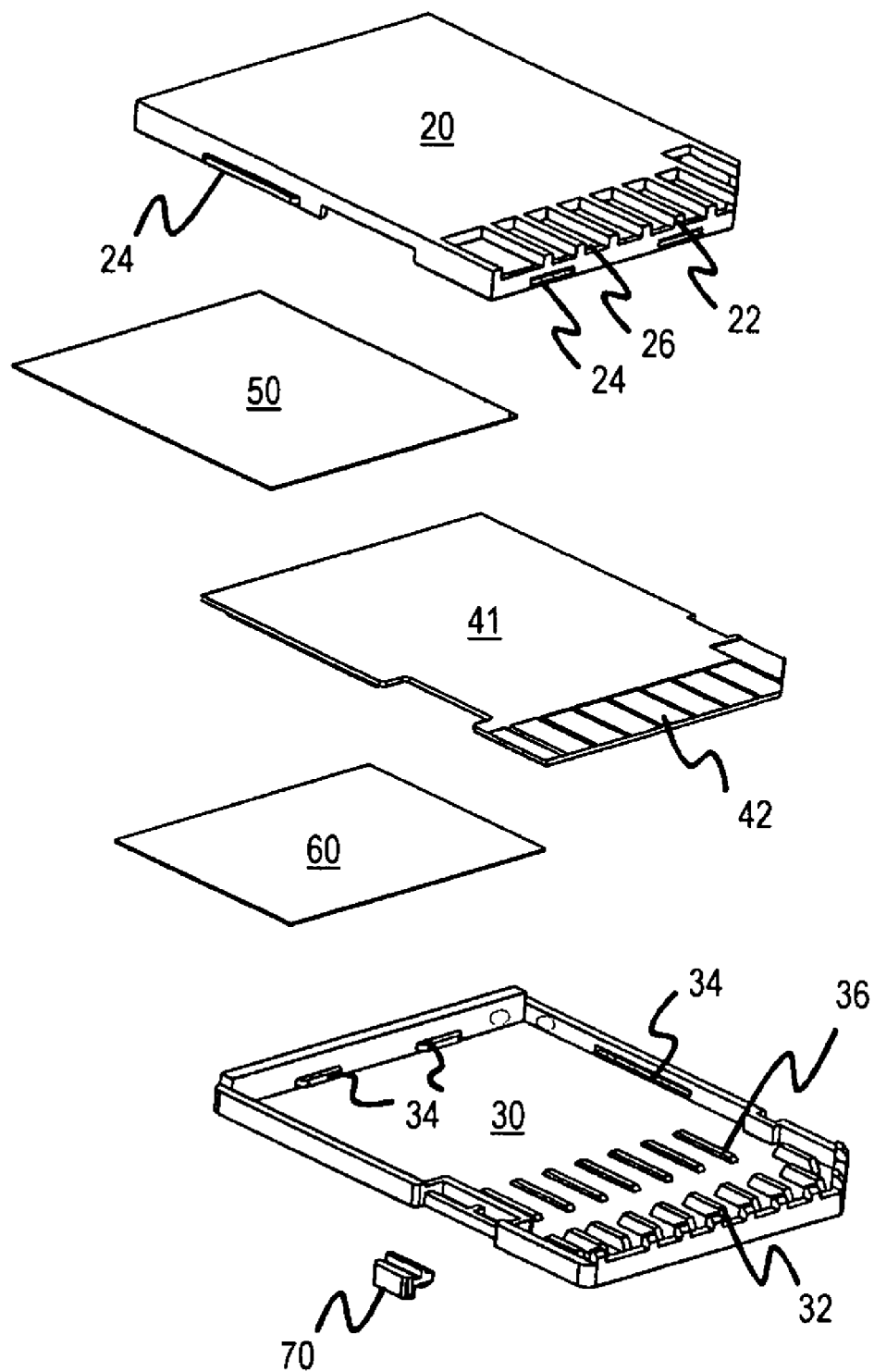
FIG. 2 shows a parts view of a Secure-Digital flash card assembled using a snap-coupled process.

FIG. 2 shows a parts view of a Secure-Digital flash card assembled using a snap-coupled process. PCBA 41 is enclosed by upper case 20 and lower case 30. PCBA 41 is a circuit board such as a printed-circuit board (PCB) with wiring traces, and has a flash-memory chip and a controller chip and components soldered to the bottom surface (hidden from this view) of the circuit board. PCBA 41 also has SD contact pads 42 formed along the front edge of the circuit board. SD contact pads 42 mate with socket pads on a SD socket that the Secure-Digital flash card fits into, such as on a host or in an electronic device.

Upper case 20 has contact openings 26 between dividers 22 along the front side. SD contact pads 42 are exposed by contact openings 26 when PCBA 41 is assembled into upper case 20, thus allowing SD contact pads 42 to make electrical connection when inserted into an SD socket.

During assembly, PCBA 41 is fitted inside upper case 20. PCBA 41 may be fitted at a slanting angle within upper case 20 (See FIG. 7) to allow SD contact pads 42 to fit within contact openings 26 while still having room within upper case 20 and lower case 30 for chips mounted to the bottom side of PCBA 41. The slanting angle may be 1-2 degrees in some embodiments, depending on the length of and the thickness between the upper and lower cases.

The sub-assembly of PCBA 41 inside upper case 20 is then fitted into lower case 30. Lower case 30 is slightly larger than upper case 20 so that the side-walls of upper case 20 fit inside the side-walls of lower case 30. Snap-tabs 24 on the outer perimeter of upper case 20 fit into slots 34 formed on the inner side-walls of lower case 30. When upper case 20 is fully inserted into lower case 30, snap-tabs 24 snap into slots 34, locking upper case 20 into lower case 30. PCBA 41 is thus encased within upper case 20 and lower case 30.

Since PCBA 41 may be at a slanting angle within upper case 20 and lower case 30, supporting ribs may be added to lower case 30 to support PCBA 41 at this slanting angle. Supporting ribs 36 are formed at about one-third of the device's length within lower case 30, while end ribs 32 are formed closer to the insertion end of lower case 30.

Both supporting ribs 36 and end ribs 32 may touch the bottom surface of PCBA 41, providing support between PCBA 41 and lower case 30. End ribs 32 are shorter than supporting ribs 36, to conform to the slanting angle of PCBA 41, which is lower within lower case 30 at the insertion end than at the far end opposite the insertion end. This slanting angle allows for thicker chips at the far end of PCBA 41, on the bottom surface of PCBA 41.

Figure 4A:
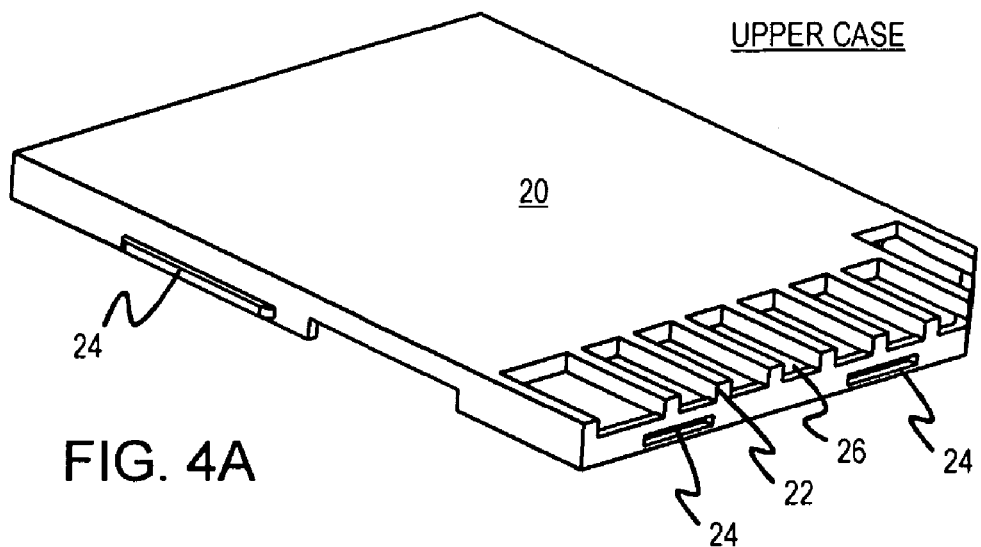
FIGS. 4A-B show detailed views of the upper and lower cases.
Figure 5A:
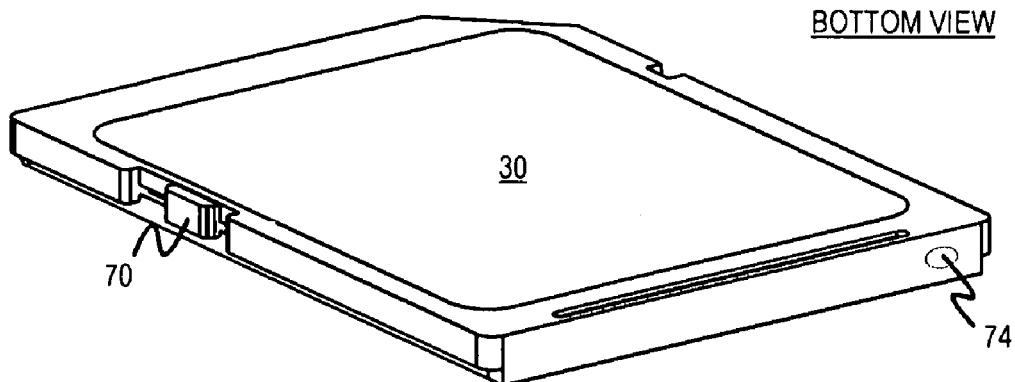
FIGS. 5A-B show views of a final assembled SD flash card.
Figure 5B:
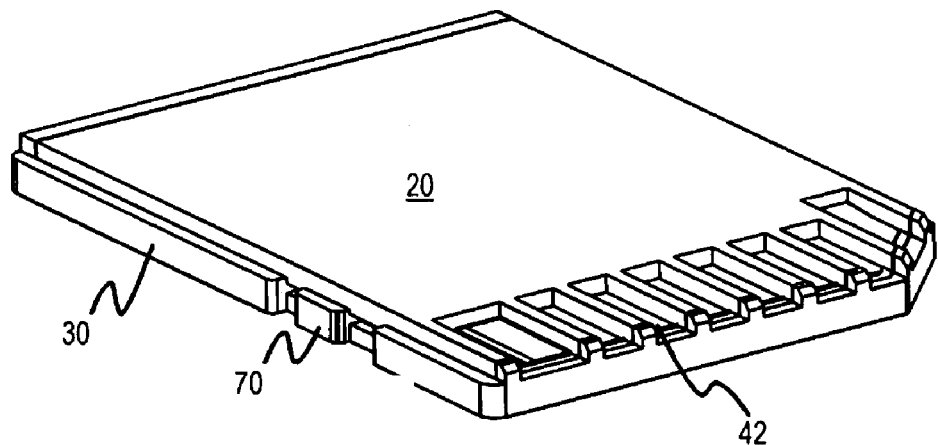

SD contact pads 42 at the insertion end of PCBA 41 are lowered within the casing because contact openings 26 in upper case 20 force SD contact pads 42 to be lower within the casing (See FIG. 4A and FIG. 5B).

Supporting ribs 36 and end ribs 32 can be formed as raised ridges on lower case 30. Supporting ribs 36 and end ribs 32 can be sufficiently tall to reach the lower surface of the circuit board of PCBA 41 to add support of the final assembled flash drive. Supporting ribs 36 and end ribs 32 can thus prevent the middle of lower case 30 from flexing or dimpling inward when a user pinches together the centers of upper case 20 and lower case 30 of the assembled device. Supporting ribs 36 and end ribs 32 can thus give the finished device a more rugged and solid feel in the user's hands, increasing the user's perception of quality of the device.

Switch 70 is inserted onto a switch-slot on lower case 30. Switch 70 can be a slidable switch that is used to activate write or erasure protection, making the flash memory read-only when switch 70 is activated by the user. Switch 70 may be attached to lower case 30 before assembly or after assembly.

Contact layers of adhesive may be used to secure the upper and lower cases together to enclose PCBA 41. Upper adhesive film 50 bonds upper case 20 to PCBA 41, while lower adhesive film 60 bonds lower case 30 to PCBA 41.

During assembly, upper adhesive film 50 is placed inside upper case 20, and PCBA 41 is fitted inside upper case 20. PCBA 41 makes contact with upper adhesive film 50. Lower adhesive film 60 is then placed inside lower case 30, and the sub-assembly of upper case 20 and PCBA 41 is fitted into lower case 30 and snapped together.

Upper adhesive film 50 and lower adhesive film 60 can be a film with a heat-activated adhesive, such as a thermal-bond film (for example, product number TBF668 produced by 3M). The adhesive is then compressed between upper case 20, lower case 30, and PCBA 41, and the assembly is held in the compressed state using a fixture or by snap-tabs 24 locked into slots 34. The fixture or device is then passed through an oven maintained at a specified temperature to activate or cure the adhesive. The oven temperature can be at or lower than the maximum safe operating temperature for the memory module components.

An advantage of heat-activated adhesives is that they can be removed by heating, and thus enable reworking of flash devices. To separate upper case 20 from lower case 30 during re-work, a heating machine with a temperature of about 150° C. may be used for several seconds to remove or loosen the adhesives.

Figure 3A:
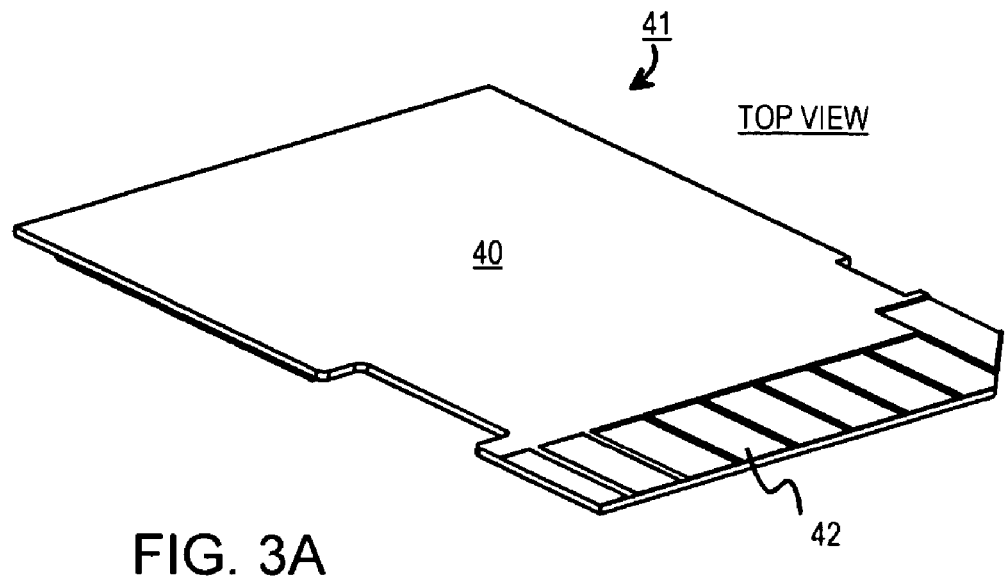
FIGS. 3A-B show the circuit-board assembly in detail.
Figure 3B:
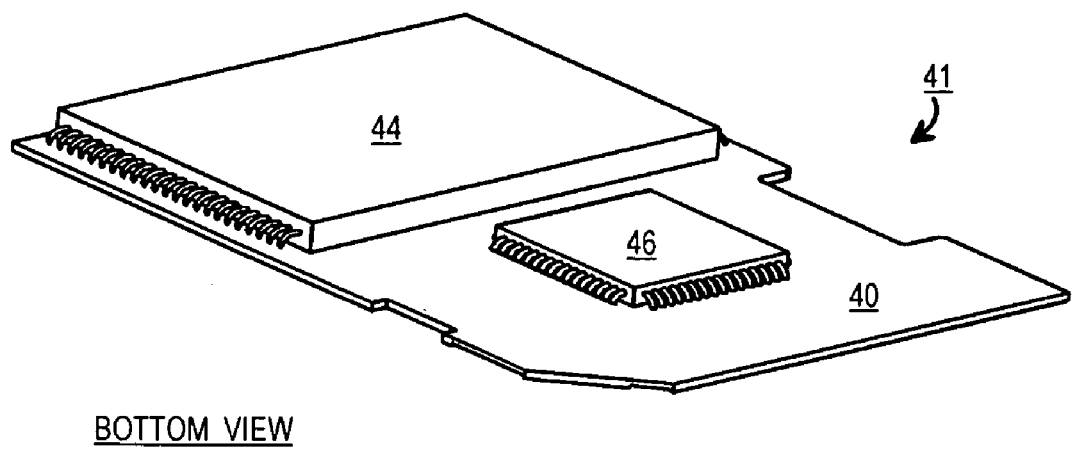

FIGS. 3A-B show the circuit-board assembly in detail. In the top view of FIG. 3A, PCBA 41 includes a circuit board with wiring traces on several layers, and vias or other interlayer connections. SD contact pads 42 are formed along the front (insertion) end of circuit board 40 using a layout dictated by the SD standard.

In the bottom view of FIG. 3B, flash-memory chip 44 is mounted to the bottom surface of circuit board 40. Controller chip 46 is also mounted to circuit board 40, between flash-memory chip 44 and the insertion end of circuit board 40, which has SD contact pads 42 on the top surface as shown in FIG. 3A. Controller chip 46 can have an SD or other bus interface to communicate with a host over SD contact pads 42. Controller chip 46 can also have a flash controller that reads, erases, and writes blocks of data to flash-memory chip 44, perhaps including wear-leveling and address re-mapping logic and tables.

Supporting ribs 36 and end ribs 32 of lower case 30 make contact with the bottom surface of circuit board 40, at the area on circuit board 40 between controller chip 46 and the insertion (front) end. This contact allows SD contact pads 42 to be in downward position within upper case 20, as required by the SD specification, yet also allows the far (back) end of circuit board 40 to slant upward, making more room for chips 44, 46.

Figure 4B:
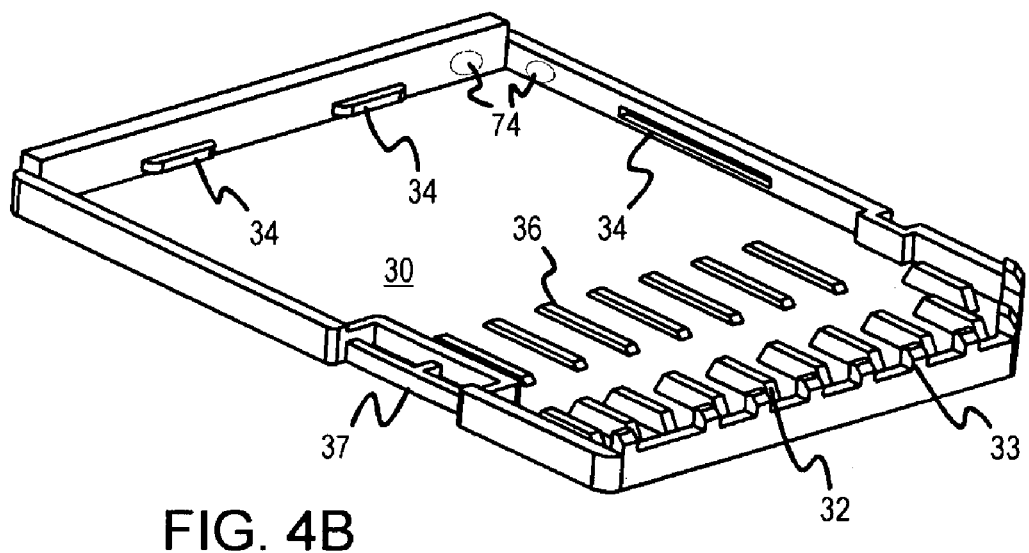

FIGS. 4A-B show detailed views of the upper and lower cases. FIG. 4A shows a top view of upper case 20, while FIG. 4B shows a top view of lower case 30. In FIG. 4A, upper case 20 has contact openings 26 between dividers 22 along the front side. SD contact pads 42 (not shown) are exposed by contact openings 26 when PCBA 41 is assembled into upper case 20, thus allowing SD contact pads 42 to make electrical connection when inserted into an SD socket.

In FIG. 4B, lower case 30 is slightly larger than upper case 20 so that the side-walls of upper case 20 fit inside the side-walls of lower case 30. Snap-tabs 24 on the outer perimeter of upper case 20 fit into slots 34 formed on the inner side-walls of lower case 30. When upper case 20 is fully inserted into lower case 30, snap-tabs 24 snap into slots 34, locking upper case 20 into lower case 30. PCBA 41 is thus encased within upper case 20 and lower case 30.

Since PCBA 41 may be at a slanting angle within upper case 20 and lower case 30, supporting ribs may be added to lower case 30 to support PCBA 41 at this slanting angle. Supporting ribs 36 are formed at about one-third of the device's length within lower case 30, while end ribs 32 are formed closer to the insertion end of lower case 30. End ribs 32 fit under and support SD contact pads 42 on the assembled device and may be made wider and stronger to support external pressure that may be applied on SD contact pads 42 during rough use. Ideally, end ribs 32 may each be located under the center of each of SD contact pads 42.

Both supporting ribs 36 and end ribs 32 may touch the bottom surface of PCBA 41, providing support between PCBA 41 and lower case 30. End ribs 32 are shorter than supporting ribs 36, to conform to the slanting angle of PCBA 41, which is lower within lower case 30 at the insertion end than at the far end opposite the insertion end. This slanting angle allows for thicker chips at the far end of PCBA 41, on the bottom surface of PCBA 41.

Front teeth 33 on lower case 30 fit in front of dividers 22 on the final assembled device. Since upper case 20 fits within lower case 30, front teeth 33 fit in front of dividers 22. Switch mount 37 is formed on the side wall of lower case 30. Switch mount 37 is for receiving switch 70. Switch 70 may slide along switch mount 37. Holes 74 formed on back-side walls of lower case 30 are for receiving an external string or chain, such as a key chain for transporting the device.

FIGS. 5A-B show views of a final assembled SD flash card. FIG. 5A shows a bottom view from the back of the final assembled flash-card device, with lower case 30 covering PCBA 41. The side walls visible are from lower case 30, since lower case 30 fits over upper case 20. Switch 70 is visible on one side, and holes 74 for receiving a chain or string in the back of the device.

FIG. 5B shows a top view of the front (insertion) end of the final assembled flash-card device, with upper case 20 covering PCBA 41. SD contact pads 42 extend from front openings in upper case 20. The side walls visible are part of lower case 30. SD contact pads 42 can be inserted into a SD socket such as on a host computer, and can be read as a mass-storage device, replacing a rotating hard disk. Mass-storage devices are read in large blocks or streams of data, rather than as randomly-addressable words.

Figure 6A:
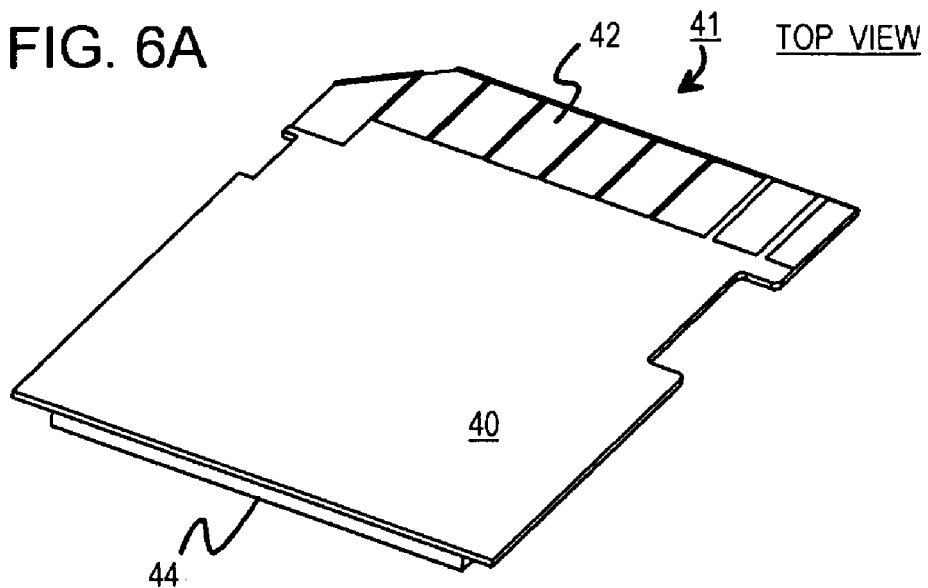
FIGS. 6A-B show views of the circuit-board assembly.
Figure 6B:
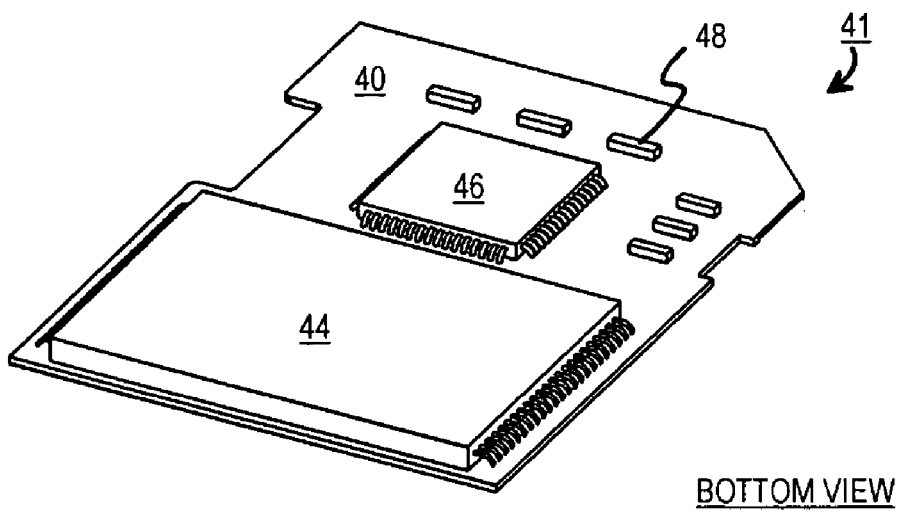

FIGS. 6A-B show views of the circuit-board assembly. In the top view of FIG. 6A, PCBA 41 includes a circuit board with wiring traces on several layers, and vias or other inter-layer connections. SD contact pads 42 are formed along the front (insertion) end of circuit board 40 using a layout dictated by the SD standard. A small portion of flash-memory chip 44 is visible underneath circuit board 40 in this view.

In the bottom view of FIG. 6B, flash-memory chip 44 is mounted to the bottom surface of circuit board 40. Controller chip 46 is also mounted to circuit board 40, between flash-memory chip 44 and the insertion end of circuit board 40, which has SD contact pads 42 on the top surface as shown in FIG. 3A. Controller chip 46 can have an SD or other bus interface to communicate with a host over SD contact pads 42. Controller chip 46 can also have a flash controller that reads, erases, and writes blocks of data to flash-memory chip 44, perhaps including wear-leveling and address re-mapping logic and tables. Other components 48 may include capacitors, resistors, buffers, or other chips.

Supporting ribs 36 and end ribs 32 of lower case 30 make contact with the bottom surface of circuit board 40, at the area on circuit board 40 between controller chip 46 and the insertion (front) end. This contact allows SD contact pads 42 to be in downward position within upper case 20, as required by the SD specification, yet also allows the far (back) end of circuit board 40 to slant upward, making more room for chips 44, 46.

Figure 7:
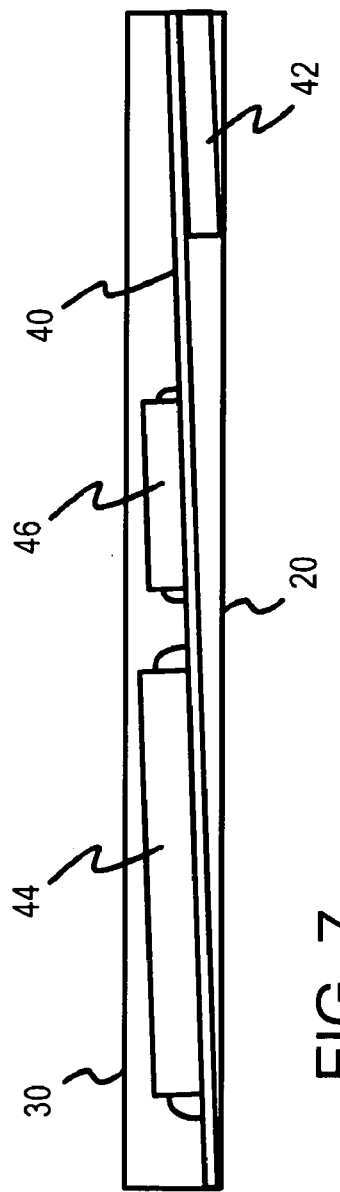
FIG. 7 is a cross-sectional diagram highlighting the slanting of the circuit board.

FIG. 7 is a cross-sectional diagram highlighting the slanting of the circuit board. Circuit board 40 has flash-memory chip 44 and controller chip 46 and other components mounted to the bottom surface by the far end, while SD contact pads 42 are formed on the top surface by the insertion end. Lower case 30 and upper case 20 encase circuit board 40 and its components.

Contact openings 26 in upper case 20 force the upper surface of SD contact pads 42 to be positioned at about half of the thickness of the SD device. Dividers 22 between contact openings 26 have a greater height or thickness.

Since chips 44, 46 are relatively thick, circuit board 40 is slanted upward at the far end, allowing more space for chips 44, 46. The position of the insertion end of circuit board 40 with SD contact pads 42 is fixed by the SD mechanical specification to be near the device center-line, at about half the device thickness. Thus circuit board 40 is near the center-line at the insertion end, but slants upward toward the far end, providing additional space for chips 44, 46. This slanting of circuit board 40 more efficiently uses the volume within upper and lower case 20, 30. If circuit board 40 were to have no slant and remain at the device center-line, chips 44, 46 would extend above upper case 20, requiring that upper case 20 be raised, increasing device thickness.

Figure 8:
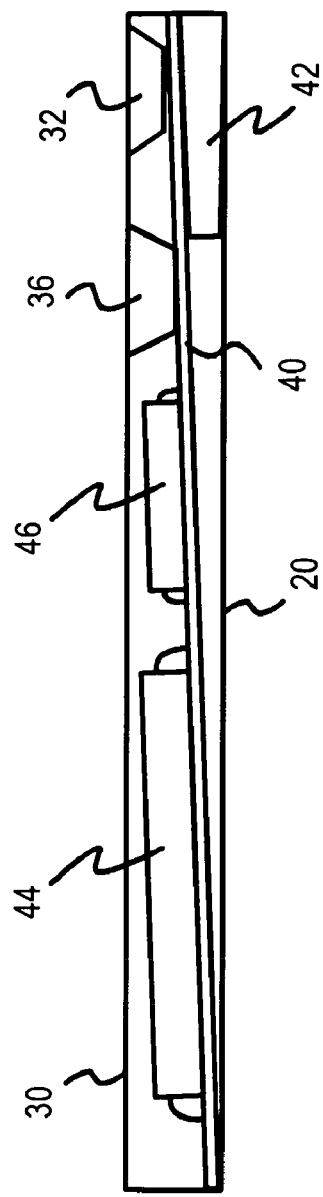
FIG. 8 shows end ribs formed on the lower case support the SD contact pads.

FIG. 8 shows end ribs formed on the lower case support the SD contact pads. End ribs 32 are formed on lower case 30, below SD contact pads 42. Supporting ribs 36 are formed farther back in the device, between controller chip 46 and SD contact pads 42. Both end ribs 32 and supporting ribs 36 are formed on the inside of lower case 30, and are located under the bottom surface of circuit board 40.

Advantages of the flash card device include a compact size, light weight, low power consumption, and the reliability of completely solid-state components with no moving parts. There is no mechanism for mechanical fatigue since the moving parts of the hard disk are replaced by flash-memory chips, which offer superb shock and vibration resistance.

Alternate Embodiments

Several other embodiments are contemplated by the inventors. For example, while a connector and a controller chip for the SD protocol has been described, other bus protocols and physical connectors could be substituted, such as small-computer system interface (SCSI), compact flash, serial AT attachment (SATA), and PCI Express, ExpressCard, Firewire (IEEE 1394), integrated device electronics (IDE), Multi-Media Card (MMC), etc. While Secure-Digital (SD) has been described, other variations of SD may be substituted, such as Super Digital, which may not have some security features of SD.

Controller chip 46 and flash-memory chip 44 may be packaged in a variety of integrated circuit packages, such as Thin-Outline Small Package (TOSP), Ball-Grid Array (BGA), Chip-On-Board (COB), or in a multi-chip package.

The upper and lower cases could be formed from metal in some embodiments, such as when using screws, or could be plastic, such as for ultrasonic bonding. Combinations of plastic and metal could be used. The form factor for the flash-card device could vary.

Directional terms such as upper, lower, up, down, top, bottom, etc. are relative and changeable as the device is rotated, flipped over, etc. These terms are useful for describing the device but are not intended to be absolutes. Some embodiments may have chips or other components mounted on only one side of the circuit board, while other embodiments may have components mounted on both sides. In some embodiments the lower case could be smaller than the upper case, or vice-versa.

An alternative process to the above heat-activated adhesive film is to use high viscosity adhesives. The adhesive can be applied to the case surface by manual or automatic using dispensing machine. After dispensing adhesives onto the case surface, immediately press the case against PCBA. A press fixture may be used to hold the case and PCBA in position. The curing time is about several minutes.

Various combinations of processes may be used. For example, the adhesive films may be used with the screw-together method rather than with snap-tabs. Alignment sockets may be added to other embodiments. Center lines or more numerous ridges may be added to stiffen the upper or lower cases. Various cosmetic features, decals, and indicia may be added.

Rather than mount packaged IC's onto the surfaces of the circuit board, unpackaged die may be mounted using die-bonding techniques. Using unpackaged die rather than packaged die may reduce the size and weight of the PCBA.

Snap-tabs with more complex movable latching teeth or extensions or locking portions may also be used in many variations. Different thicknesses and dimensions can be substituted for the examples given. The number and arrangement of chips may vary.

Various design features such as cutouts, holes, supporting underside ribs, or bumps can be added. A variety of materials may be used for the connector, circuit boards, metal pads, cases, etc. Plastic cases can have a variety of shapes and may partially or fully cover different parts of the circuit board and connector, and can form part of the connector itself. Metal covers rather than plastic may be used in some embodiments. Various features can have a variety of shapes and sizes. Oval, round, square, rectangular, trapezoidal, and other shapes may be used.

Rather than use the flash-card device only for flash-memory storage, additional features may be added. For example, a music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IrDA may also be added. A BlueTooth transceiver to a wireless mouse, PDA, keyboard, printer, digital camera, MP3 player, or other wireless device may also be added. The BlueTooth transceiver could replace the connector as the primary connector. A BlueTooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on the PCB before being enclosed into a plastic or metallic enclosure. Of course, the size of the flash-card device may increase.

Figure 1:
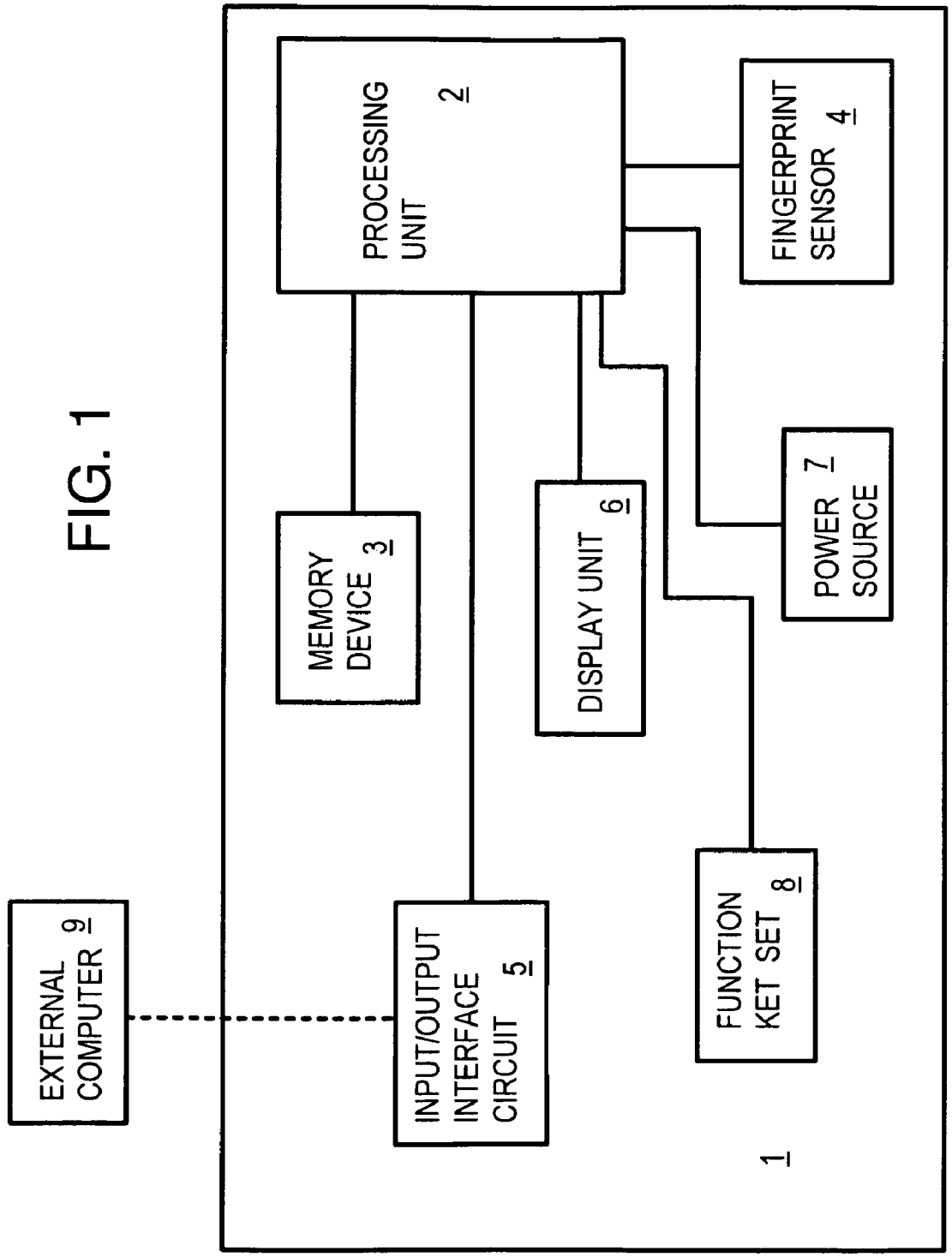
FIG. 1 is a schematic circuit block diagram illustrating an electronic data storage medium disclosed in the parent application.

A fingerprint scanner, display, keypad, power supply, or other accessories could be added to the flash-drive device with suitable changes to the casing to allow space and user access to these devices if needed. Alternately, the flash device may delete these components and just have input/output interface circuit 5, processing unit 2, and a flash memory device in the arrangement of FIG. 1. Power may be supplied through the connector. Input/output interface circuit 5 may be integrated with processing unit 2 as controller chip 45.

An indicator lamp such as an light-emitting diode (LED) could be added to the PCBA. The case may have an opening, thinning of the plastic, or a lens to allow light from the indicator lamp to shine through the case. A light pipe or light channel could be added.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for manufacturing a flash-memory device comprising:

forming contact pads on an upper surface of a printed-circuit board (PCB);

forming a PCB assembly by soldering a flash-memory chip onto a lower surface of the PCB and soldering a controller chip to the lower surface of the PCB;

wherein the contact pads are for carrying signals from an external computer to the controller chip to instruct the controller chip to read blocks of data from the flash-memory chips;

forming an upper case by molding plastic;

forming locking tabs on the upper case when forming the upper case;

forming a lower case by molding plastic, the lower case having an outside surface as a largest external surface of the lower case;

forming engagement slots on the lower case when forming the lower case;

forming supporting ribs on the lower case when forming the lower case, the supporting ribs for supporting the PCB assembly at a slanted angle within the lower case wherein the upper and lower surfaces of the PCB are not parallel with the outside surface of the lower case;

fitting the PCB assembly into the upper case to form a sub-assembly of the PCB assembly and the upper case;

sliding the upper case into the lower case until the locking tabs on the upper case snap into the engagement slots on the lower case to secure the upper case to the lower case;

wherein the upper and lower surfaces of the PCB are not parallel with the outside surface of the lower case;

whereby the PCB assembly is at the slanted angle within the lower case when the flash-memory device is assembled using a snap-together process.

2. The method of claim 1 further comprising:

inserting an upper adhesive film between the PCB assembly and the upper case during assembly;

inserting a lower adhesive film between the PCB assembly and the lower case during assembly;

whereby the upper adhesive film bonds the upper case to the PCB assembly and the lower adhesive film bonds the lower case to the PCB assembly during assembly.

3. The method of claim 1 further comprising:

forming end ribs inside the lower case when forming the lower case, wherein each end rib is located directly underneath a contact pad on the upper surface of the PCB when assembled;

wherein the end ribs increase rigidity of the contact pads within the lower case.

4. The method of claim 1 wherein the contact pads are below a center-line between the upper case and the lower case when assembled;

wherein the PCB is slanted upward and is above the center-line at the flash-memory chip, whereby the PCB straddles the center-line for an asymmetric flash-memory device design.

\* \* \* \* \*